US008824666B2

(12) United States Patent
Conte et al.

(10) Patent No.: US 8,824,666 B2
(45) Date of Patent: Sep. 2, 2014

(54) NOISE CANCELLATION FOR PHONE CONVERSATION

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 833 days.

(21) Appl. No.: 12/400,488

(22) Filed: Mar. 9, 2009

(65) Prior Publication Data
US 2010/0226491 A1 Sep. 9, 2010

(51) Int. Cl.
*H04M 9/08* (2006.01)

(52) U.S. Cl.
USPC ............................... 379/406.02; 379/406.03

(58) Field of Classification Search
USPC ........................... 381/73.1, 71.1, 71.8, 71.11; 379/406.02, 406.03
See application file for complete search history.

(56) References Cited

U.S. PATENT DOCUMENTS

| 5,444,786 | A | 8/1995 | Raviv |
| 5,555,891 | A | 9/1996 | Eisenfeld |
| 5,774,055 | A | 6/1998 | Pomerantz ................. 340/573.7 |
| 5,853,005 | A | 12/1998 | Scanlon ........................ 600/459 |
| 6,321,197 | B1 * | 11/2001 | Kushner et al. ............... 704/270 |
| 6,480,733 | B1 | 11/2002 | Turcott ......................... 600/516 |
| 6,544,199 | B1 | 4/2003 | Morris .......................... 600/590 |
| 6,553,256 | B1 | 4/2003 | Jorgenson et al. ................. 607/5 |
| 6,575,902 | B1 | 6/2003 | Burton |
| 6,611,783 | B2 | 8/2003 | Kelly, Jr. et al. |
| 6,616,613 | B1 | 9/2003 | Goodman |
| 6,997,882 | B1 | 2/2006 | Parker et al. |
| 7,248,915 | B2 | 7/2007 | Ronnholm .................... 600/544 |
| 7,277,749 | B2 | 10/2007 | Gordon et al. .................... 607/2 |
| 7,550,826 | B2 | 6/2009 | Orth et al. |
| 7,690,253 | B2 | 4/2010 | Noda et al. |
| RE41,376 | E | 6/2010 | Torch ............................ 340/575 |
| 7,835,529 | B2 | 11/2010 | Hernandez et al. .......... 381/71.2 |
| 7,866,212 | B2 | 1/2011 | Ariav et al. ...................... 73/596 |

(Continued)

FOREIGN PATENT DOCUMENTS

| JP | 07099329 A * 4/1995 |
| KR | 1020000003827 1/2000 |

(Continued)

OTHER PUBLICATIONS

"Snoring and Sleep Apnea", Health Wellness Resources, Information & Resources for Sleep Apnea: Chemistry Behind Sleep Apnea and Snoring (2007), http://wayback.archive.org/web/20071001000000*/http://www.healthwellness1.com/sleepapnea/snoring_and_sleep_apnea.php (Visited Jul. 12, 2011. 8:49 pm) Comments:Obtained Feb. 7, 2007 version from www.waybackmachine.org, 2006, pp. 1-3.

*Primary Examiner* — Alexander Jamal
(74) *Attorney, Agent, or Firm* — Dorsey & Whitney LLP

(57) ABSTRACT

The present disclosure relates to systems and methods for noise cancellation of phone conversation. Some of the systems can include a phone having a microphone and a noise cancellation device. In some examples, the noise cancellation device has a microphone for receiving an input sound wave and positioned proximate the phone microphone, a processor for generating a noise cancellation sound wave based on the input sound wave, and a speaker for outputting the noise cancellation sound wave. The phone microphone and the noise cancellation device microphone can be shared or different microphones, and can also be microphone is integral to the phone. The shared or separate microphones can be part of a phone headset.

3 Claims, 12 Drawing Sheets

(56) References Cited

U.S. PATENT DOCUMENTS

| | | |
|---|---|---|
| 8,172,766 B1 | 5/2012 | Kayyali et al. |
| 8,193,941 B2 | 6/2012 | Wolfe et al. |
| 2002/0142811 A1* | 10/2002 | Gupta et al. ............... 455/570 |
| 2003/0088196 A1 | 5/2003 | Steve |
| 2003/0163287 A1 | 8/2003 | Vock et al. |
| 2004/0148169 A1* | 7/2004 | Baker ........................ 704/254 |
| 2004/0193003 A1 | 9/2004 | Mechlenburg et al. |
| 2005/0038647 A1* | 2/2005 | Baker ........................ 704/231 |
| 2005/0065778 A1* | 3/2005 | Mastrianni et al. ........ 704/200.1 |
| 2005/0074055 A1* | 4/2005 | Takatori et al. ............ 375/219 |
| 2006/0224072 A1 | 10/2006 | Shennib |
| 2006/0267779 A1 | 11/2006 | Ishikawa et al. |
| 2007/0270550 A1 | 11/2007 | Perrault et al. |
| 2007/0293781 A1 | 12/2007 | Sims et al. |
| 2008/0094226 A1 | 4/2008 | O'Shea et al. ............. 340/573.1 |
| 2008/0262381 A1 | 10/2008 | Kolen |
| 2008/0306706 A1 | 12/2008 | Markovic |
| 2009/0012786 A1* | 1/2009 | Zhang et al. ............... 704/233 |
| 2009/0131759 A1 | 5/2009 | Sims et al. |
| 2009/0147965 A1 | 6/2009 | Kuo |
| 2009/0182913 A1 | 7/2009 | Rosenblatt et al. ............. 710/72 |
| 2009/0278820 A1 | 11/2009 | Fourquin et al. .............. 345/184 |
| 2009/0315719 A1 | 12/2009 | Song et al. |
| 2010/0052896 A1 | 3/2010 | Goodman |
| 2010/0217158 A1 | 8/2010 | Wolfe et al. .................. 600/595 |
| 2010/0217345 A1 | 8/2010 | Wolfe et al. .................... 607/17 |
| 2010/0261984 A1 | 10/2010 | Tsai et al. |
| 2010/0283618 A1 | 11/2010 | Wolfe et al. .................. 340/575 |
| 2010/0286545 A1 | 11/2010 | Wolfe et al. .................. 600/534 |
| 2010/0286567 A1 | 11/2010 | Wolfe et al. .................. 600/587 |
| 2012/0220888 A1 | 8/2012 | Wolfe et al. |

FOREIGN PATENT DOCUMENTS

| | | |
|---|---|---|
| KR | 1020000038271 A | 7/2000 |
| KR | 1020050047374 A | 5/2005 |
| KR | 1020060061451 A | 6/2006 |
| KR | 1020060068562 A | 6/2006 |

\* cited by examiner

NOISE CANCELLATION FOR PHONE CONVERSATION

BACKGROUND

Mobile phones, such as cellular phones, are ubiquitous in society. In most countries, mobile phones outnumber landline phones, with fixed landlines numbering 1.3 billion but mobile subscriptions 3.3 Billion at the end of 2007. Mobile phone usage is a key means by which people communicate with each other. Use of mobile phones, however, has led to associated annoyance at mobile phone conversation noise and has led to concern regarding security of conversations.

Mobile phone use can be an important matter of social discourtesy: unwanted one-sided conversations in public areas, phones ringing during funerals or weddings, in cinemas, and theatres. Some public places such as bookstores, libraries, bathrooms, cinemas, doctors' offices, and places of worship where silence or quiet is desired prohibit the use of mobile phones, so that other patrons will not be disturbed by conversations. Mobile phone usage on local public transport is also increasingly seen as a nuisance. Some cities, thus, have mandated a total ban of mobile phones on public transportation. Some transportation providers, particularly those involving long-distance services, offer a quiet carriage where phone use is prohibited, much like the designated non-smoking carriage of the past. It is common, however, for users to ignore such bans and designations.

Mobile phone usage and the perceived annoyance of others to a user's mobile phone use has led to various facilities and establishments exploring methods to force non-use of mobile phones. For example, some facilities install signal-jamming equipment to prevent their use. However, in many countries, including the United States, such equipment is illegal. Accordingly, some public places, such as auditoriums, in the United States, have installed wire mesh in the walls to make a Faraday cage, which prevents signal penetration without violating signal jamming laws.

A related issue is the increased use of phones in public places where a user of a mobile phone may be concerned about others overhearing portions of his conversation.

The issue of mobile communication and etiquette has also become an issue of academic interest. The rapid adoption of the device has resulted in the intrusion of telephony into situations where this was previously not known. This has exposed the implicit rules of courtesy and opened them to reevaluation.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1A:
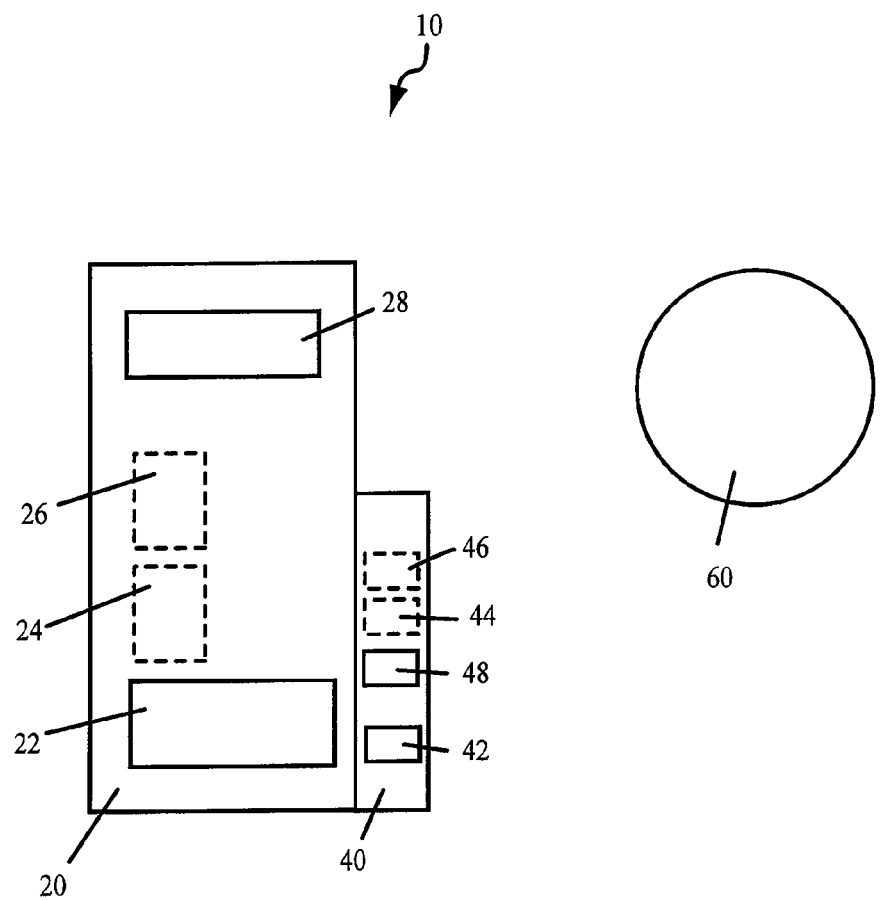
FIG. 1a depicts a phone noise cancellation system having a separate phone and noise cancellation device, in accordance with some examples.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly and implicitly contemplated herein.

This disclosure is drawn, inter alia, to methods, apparatus, computer programs and systems related to noise cancellation or reduction proximate a phone. More specifically, various methods and systems for reducing noise audible to persons proximate a user of a phone are disclosed. While the disclosure may make specific reference to noise cancellation of noise relating to the user of a mobile phone, it is to be appreciated that the systems and methods disclosed herein may be used with any phone device including land line wired phones, wireless phones, satellite phones, and others.

According to certain implementations, a phone noise cancellation system is provided for reducing noise associated with a mobile phone conversation, thereby reducing nuisance to others and increasing privacy for the mobile phone user.

When a person publicly talks on a mobile phone, there can be considerable distance at which persons surrounding the mobile phone user may be able to hear the conversation of the user. Generally, the conversation, when overheard by others, may be considered "noise" and there is an assumption that, as a whole, the public wants this "noise" to be less to minimize annoyance of others relating to a user's mobile phone usage. Similarly, there is an assumption that the mobile phone user wants to minimize the ability of others to overhear his conversation and thus to increase privacy of the conversation. While specific discussion is made herein to a noise reduction or privacy system for mobile phones, it is to be appreciated that such system may be alternatively used with other phones or devices wherein it may be desirable to employ noise reduction.

FIG. 1a depicts a phone noise cancellation system having a separate phone and noise cancellation device. As shown, the system 10 may comprise a phone 20, a noise cancellation device 40 operably coupled to the phone 20, and a voice training device 60. The voice training device 60 may be provided separately from the phone 20 and the noise cancellation device 40. The phone 20 and the noise cancellation device 40 may be substantially self-supporting, such as shown in the example of FIG. 1a. Thus, for example, the mobile phone 20 and noise cancellation device 40 may each have a microphone 22, 42, a processor 24, 44, and a power source 26, 46. Each of the mobile phone 20 and the noise cancellation device 40 further have a speaker 28, 48

Figure 1B:
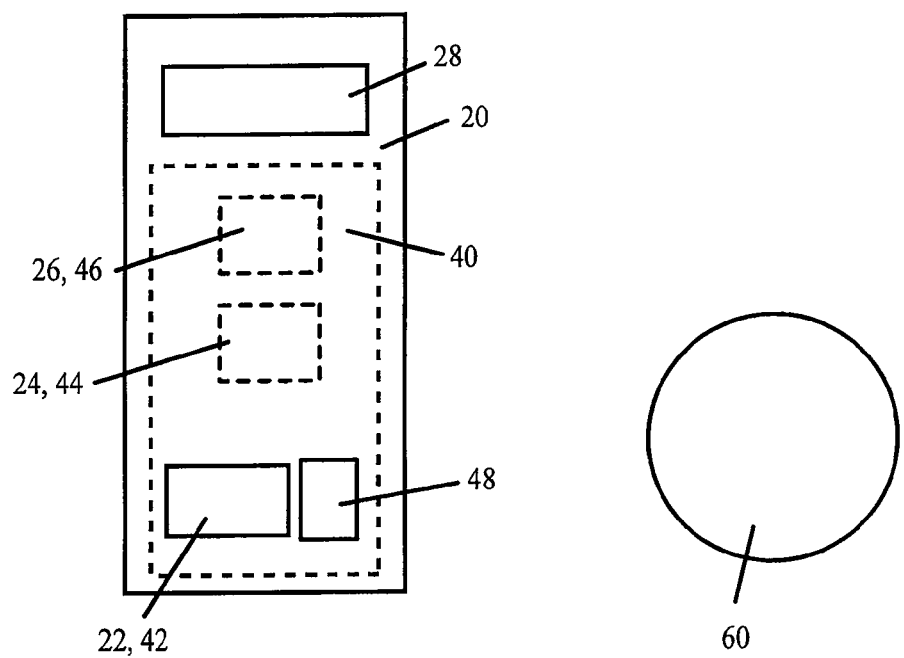
FIG. 1b depicts a phone noise cancellation system having an integral phone and noise cancellation device, in accordance with some examples.

FIG. 1b depicts a phone noise cancellation system having an integral phone and noise cancellation device. Thus, in alternate examples, the phone and the noise cancellation device may be substantially integral and may have shared components. Thus, for example, the mobile phone and the noise cancellation device may have a shared microphone 22, 42, a shared processor 22, 42, and/or a shared power source 26, 68 and may be substantially integral. A noise cancellation speaker of the noise cancellation device may be positioned such that it is proximate, or substantially co-located with, the microphone of the mobile phone, and thus the mouth of the mobile phone user when using the mobile phone. In some examples, the noise cancellation device may be retrofit to existing mobile phones.

Figure 1C:
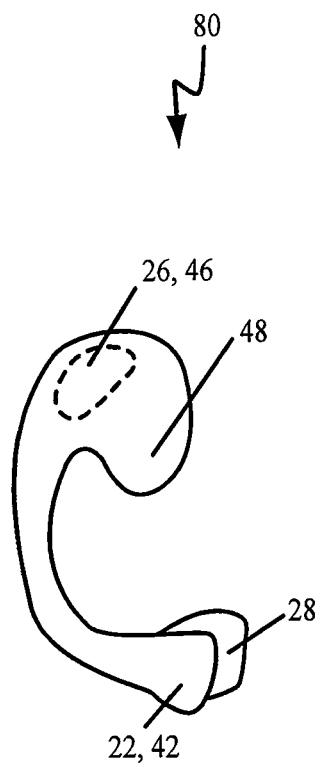
FIG. 1c depicts a headset for use with a phone noise cancellation system, in accordance with some examples.

FIG. 1c depicts a headset for use with a phone noise cancellation system. The headset 80 is suitable for use with some noise cancellation systems disclosed herein. As shown, the headset 80 includes a shared microphone 22, 42, a shared power source 26, 46, and separate speakers 28, 48.

Figure 2:
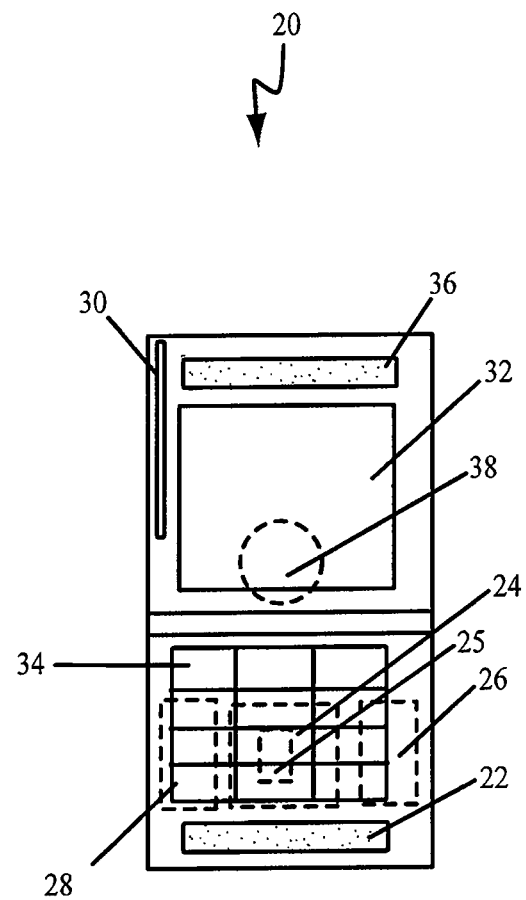
FIG. 2 depicts a phone for use with a phone noise cancellation system, in accordance with some examples.

FIG. 2 depicts a phone for use with a phone noise cancellation system. Generally, FIG. 2 illustrates a suitable a mobile phone 20 (also referred to as cellular phone) for use with a system for phone noise reduction as disclosed herein. As shown, a typical mobile phone for use with examples disclosed herein includes a microphone 22, a processor 24 and associated memory 25, a power supply 26, a Subscriber Identity Module (SIM card) or other identification device 28, an antenna 30, a display 32, a keyboard 34, a speaker 36, and an auxiliary port 38. In some examples, the mobile phone may include more or fewer components than shown in FIG. 2.

A mobile phone is a telecommunications system in which a portable or mobile radio transmitter and receiver is linked via microwave radio (or other) frequencies to base transmitter and receiver stations that connect the user to a conventional telephone network. Accordingly, most mobile phones connect to a cellular network of base stations (cell sites), which is in turn interconnected to the public switched telephone network (PSTN) (an exception is satellite phones). In addition to the standard voice function of a mobile phone, telephone, current mobile phones may support many additional services, and accessories, such as SMS for text messaging, email, packet switching for access to the Internet, gaming, infrared, camera with video recorder and MMS for sending and receiving photos and video, alarm clocks, navigation systems, and others.

When the mobile phone is turned on, it registers with the mobile telephone exchange, or switch, with its unique identifiers, and can then be alerted by the mobile switch when there is an incoming telephone call. The handset constantly listens for the strongest signal being received from the surrounding base stations, and is able to switch seamlessly between sites. As the user moves around the network, the "handoffs" are performed to allow the device to switch sites without interrupting the call. The dialogue between the handset and the cell site is a stream of digital data that includes digitised audio. The technology that achieves this depends on the system which the mobile phone operator has adopted.

The microphone 22 of the phone may be a microphone integral to the phone, as shown in FIG. 2, or may be an auxiliary microphone 22 such as one provided on a headset 80 shown in FIG. 1c. The microphone 22 may generally be configured in any way suitable for receiving an input sound wave. In some examples, the input sound wave may be a user sound wave from a user of the phone.

Generally, the processor 24 may be a microprocessor that performs duties relating to the keyboard 34, display 43, and memory 25 of the mobile phone 30. It may be configured for processing commands, controlling signals with a cellular base station, and generally handling functions of the mobile phone. Any suitable memory 25 may be used with the mobile phone 20. Typical memory devices may include ROM or flash memory chips providing storage for the phone's operating system and customizable features, such as the phone directory. In some examples, the phone memory may store information relating to use of the noise cancellation device 40.

The mobile phone 20 may have any suitable for display 43 for displaying information relating to usage of the mobile phone 20, such as phone number from which a call is being received, phone number being called, a menu, or other. Commonly, mobile phone displays may be liquid crystal displays.

The power supply 26 may be any suitable supply currently known or later developed for supplying power to a phone. Mobile phones generally obtain power from batteries, which can be recharged from a USB port, from portable batteries, from main power or a power socket in a car using an adapter (often called battery charger or wall wart), or from a solar panel or a dynamo (that can also use a USB port to plug the phone). Suitable batteries may include nickel metal-hydride batteries, lithium-ion batteries, lithium-polymer batteries, or others.

The phone 20 may be provided with a SIM card or other identification device 28. The SIM card 29 may be, for example, a microchip that (when properly activated) stores the phone's configuration data, and information about the phone itself, such as which calling plan the subscriber is using. When the subscriber removes the SIM Card, it can be re-inserted into another phone and the information relating to the first phone and subscription is transferred to the new phone. Each SIM Card is activated by use of a unique numerical identifier; once activated, the identifier is locked down and the card is permanently locked in to the activating network.

It is noted that some mobile phones do not use a SIM card and their identification device instead may be data programmed into a memory of the phone. This data may be accessed by using a special digit sequence to access the "NAM" as in "Name" or number programming menu. Using the number programming menu, a user can add information such as a new number for the phone, new Service Provider numbers, new emergency numbers, changed Authentication Key or A-Key code, and others.

Any suitable antenna 30 may be used for communicating with cell towers, satellites, or other receiver station. Any suitable speaker 36 may be used for outputting sound to the user of the mobile phone 20. An auxiliary port 38 may be a port for connecting to any device. For example, an auxiliary antenna port may facilitate connection to an external antenna, a watt cellular booster, or other auxiliary or accessory device. An auxiliary port may further be provided for facilitating connection to a noise cancellation device.

Figure 3:
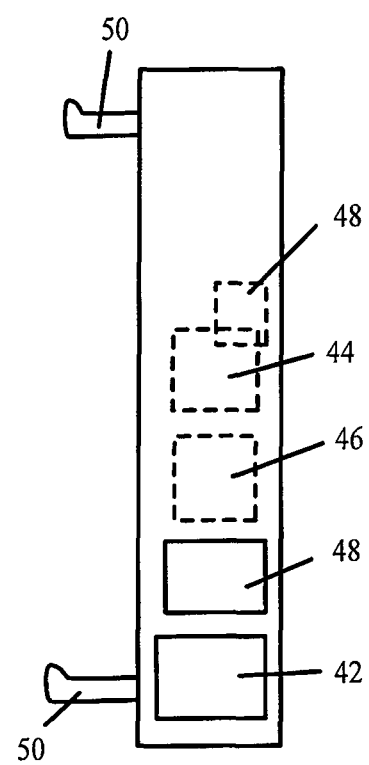
FIG. 3 depicts a noise cancellation device, in accordance with some examples.

Active noise control (ANC) (also known as noise cancellation, active noise reduction (ANR) or antinoise) is a method for reducing unwanted sound. FIG. 3 depicts a noise cancellation device. More specifically, FIG. 3 illustrates a suitable noise cancellation device 40 for use with a system for phone noise reduction as disclosed herein. As shown, the noise cancellation device 40 includes a microphone 42, a speaker 48, a processor 44, a power source 46, and an echo cancellation element 48. In some examples, the processor 44 of the noise cancellation device 40 may be a shared processor with the mobile phone. Thus, for example, the processor of the mobile phone may communicate and manage processes of the noise cancellation device. In some examples, the microphone 42 of the noise cancellation dress may be a shared microphone with the mobile phone, such as the microphone of the mobile phone. In some examples, the power source 46 of the noise cancellation device may be a shared power source with the mobile phone. For a noise cancellation device provided separate from a phone, the noise cancellation device may include a coupling mechanism such as clips 50.

Sound is a pressure wave having a compression phase and a rarefaction phase. As may be appreciated, a sound wave has a frequency, amplitude, phase, and wave shape. The speaker 48 of the noise cancellation device may be a noise cancellation speaker and emits a sound wave with the same amplitude and the opposite polarity (in antiphase) to the original sound. Generally, the noise cancellation wave may be referred to as having a shape suitable for attenuating (reducing or canceling) the original sound (the input sound wave). The waves combine to form a new wave, in a process called interference, and effectively cancel each other out. This effect is called phase cancellation. The resulting sound wave may be so faint as to be inaudible to human ears or may merely be reduced compared to the original sound wave of the speaker's voice. Thus, as will be described more fully below, the noise cancellation device emits a sound wave with the same amplitude and opposite polarity of the voice of the mobile phone user to substantially cancel or reduce the noise associated with the voice of the mobile phone user. Generally, the methods and systems described herein may be used for noise attenuation or reduction. While the terms same and identical may be used in describing sound waves and waveforms generated by the processor with respect to sound waves and waveforms received by the receiver/microphone, it is to be appreciated that there may be limitations in technology and that a waveform having substantially similar, nearly identical, or some level of similarity below truly identical, is contemplated herein and included in the description of possible waveforms generated. Further, it is to be appreciated that, for the purposes of this disclosure, any reference to noise cancellation is intended to include noise attenuation and is not intended to imply that the noise must be fully cancelled.

A receiver 42 is provided with the noise cancellation device 40 for receiving an input sound wave from the user of the mobile phone. Generally, the receiver 42 may be configured as a microphone and, in some examples, the microphone of the mobile phone may operate as the microphone for the noise cancellation device. Any suitable receiver or microphone configuration for receiving an input sound wave may be used. Such microphone may be integral to the mobile phone or may be auxiliary, such as provided on a headset. The input sound wave is communicated to the processor 44 for processing to determine amplitude and polarity of the sound wave. The processor 44 then communicates with the speaker 48 to prompt the speaker 48 to emit a cancellation sound wave with the same amplitude and opposite polarity to attenuate, reduce, or cancel the input sound wave.

As shown in the example of FIG. 3, the noise cancellation device 40 may be provided with a processor 44. As described, the processor 44 analyzes the input sound wave. Generally, the processor 44 includes an inverse waveform generator having an inverting amplifier. The inverse waveform generator receives the input (for example, the input sound wave) and creates an inverse cancellation (or attenuation) signal that can be broadcast through the noise cancellation speaker 48.

In some examples, the processor 44 may include an attenuation element for attenuating the cancellation signal based on characteristics of the local environment including, for example, the temperature of the surrounding air. The processor 44, including the attenuation element, may analyze the waveform of the background aural or nonaural noise to generate a polarization reversed waveform to substantially cancel the background noise by interference. This waveform has identical or directly proportional amplitude to the waveform of the original noise, but its polarity is reversed. This creates the destructive interference that reduces the amplitude of the perceived noise. Generally, there are many characteristics of the local environment that may be analyzed to further attenuate sound associated with mobile phone usage. Suitable detectors or sensors may be provided to gather information regarding such characteristics, as would be known to one skilled in the art.

The noise cancellation speaker 48 may have any suitable configuration for broadcasting a sound wave. In some examples, the noise cancellation speaker 48 may be located proximate to the microphone of the mobile phone and thus to the user's mouth when the mobile phone is being used. Thus, the noise cancellation speaker 48 may be referred to as generally co-located with the sound source to be attenuated. In such examples, the noise cancellation device has the same audio power level as the source of the unwanted sound. In some examples, the noise cancellation device may have a noise cancellation speaker associated with each possible microphone of the mobile phone. Thus, for example, a first noise cancellation speaker may be associated with an integral microphone of the mobile phone and a second non-cancellation speaker may be associated with an auxiliary microphone such as provided in a headset of a mobile phone. The processor of the sound cancellation device thus may include functionality for determining which microphone of the mobile phone is in use and routing the noise cancellation signal to the noise cancellation speaker associated therewith.

The power supply 46 may be any suitable supply currently known or later developed for supplying power to a noise cancellation device 40. Power may be provided to the noise cancellation device from batteries, which can be recharged from a USB port, from portable batteries, from main power or a power socket in a car using an adapter (often called battery charger or wall wart), or from a solar panel or a dynamo (that can also use a USB port to plug the phone). Suitable batteries may include nickel metal-hydride batteries, lithium-ion batteries, lithium-polymer batteries, or others. In some examples, the power source 46 may be a shared power source with the mobile phone.

In some examples, the noise cancellation device 40 may be provided with an echo cancellation element 48. The term echo cancellation is used in telephony to describe the process of removing echo from a voice communication in order to improve voice quality on a telephone call. In addition to improving subjective quality, this process increases the capacity achieved through silence suppression by preventing echo from traveling across a network. Two sources of echo are generally considered in telephony: acoustic echo and hybrid echo. Speech compression techniques and digital processing delay often make these echoes more severe in telephone networks.

Echo cancellation typically involves first recognizing the originally transmitted signal that re-appears, with some delay, in the transmitted or received signal. Once the echo is recognized, it can be removed by 'subtracting' it from the transmitted or received signal. This technique may be implemented using a digital signal processor (DSP) or may be implemented in software. Echo cancellation is done using either echo suppressors or echo cancellers, or in some cases both.

Accordingly, the echo cancellation device 48 recognizes the waveform output by the speaker of the noise cancellation device when it reappears through the microphone of the phone and suppresses or cancels that waveform. A variety of echo cancellation devices are known in the art and any suitable echo cancellation device may be used. The echo cancellation device 48 may be configured as part of the processor 44, as software run by the processor 44, or other.

In some examples, the noise cancellation device may plug into an auxiliary port of an existing mobile phone.

A voice training device may be provided to train the processor of the noise cancellation device to identify the user's sound wave. The noise cancellation device may be trained to output a wave form substantially coincident in frequency with the wave form of the voice of the mobile phone user. Generally, if the inverted signal (the signal output by the noise cancellation device) has too high a frequency, a buzzing will result. If the inverted signal has too low a frequency, noise attenuation may not be achieved. Generally, the voice training device may comprise a software package that may create an output for communication to the processor of the noise cancellation device and/or phone processor. Such output may be stored in the memory of the mobile phone or may be stored in the memory of the noise cancellation device. The voice training device may be based on speech recognition technology. It is to be appreciated, however, that the noise cancellation device merely identifies frequency and amplitude of the user's speech pattern and may not typically recognize specific words. Thus, software of the voice training device may be less complex than commonly available speech recognition software.

Speech recognition (also known as automatic speech recognition or computer speech recognition) converts spoken words to machine-readable input (for example, to key presses, using the binary code for a string of character codes). The voice training device may use any known basis for speech recognition systems. For example, the voice training device may be based on Hidden Markov models (HMMs). HHMs are statistical models that output a sequence of symbols or quantities. Speech signal may be considered a piecewise stationary signal or a short-time stationary signal. For example, one could assume in a short-time in the range of 10 milliseconds, speech could be approximated as a stationary process. Speech thus may be considered of as a Markov model for many stochastic processes.

HMMs can be trained automatically and are simple and computationally feasible to use. In speech recognition, the hidden Markov model outputs a sequence of n-dimensional real-valued vectors (with n being a small integer, such as 10), outputting one of these every 10 milliseconds. The vectors consist of cepstral coefficients, which may be obtained by taking a Fourier transform of a short time window of speech and decorrelating the spectrum using a cosine transform, then taking the first (most significant) coefficients. The hidden Markov model typically has in each state a statistical distribution that is a mixture of diagonal covariance Gaussians which will give a likelihood for each observed vector. Each word, or in some examples, each phoneme, has a different output distribution. A hidden Markov model for a sequence of words or phonemes is made by concatenating the individual trained hidden Markov models for the separate words and phonemes. It is to be appreciated that in some embodiments the voice training device may employ methods relating to phenomes rather than words.

Generally, the voice training device may thus use an HMM-based approach to speech recognition or other standard technique or combination of standard techniques for speech recognition. For example, it may use cepstral normalization to normalize for different speaker and recording conditions; for further speaker normalization it may use vocal tract length normalization (VTLN) for male-female normalization, and maximum likelihood linear regression (MLLR) for more general speaker adaptation.

The voice training device may use an enrollment period or short period of training to familiarize the noise cancellation device with the user of the mobile phone. Such enrollment periods are known to those skilled in the art and generally successfully capture continuous speech with a large vocabulary at normal pace with a very high accuracy. The enrollment period may comprise the voice training device operating an enrollment stage during which the user of the mobile phone is prompted to say specific words having a range of sounds. The voice training device may be coupled with the noise cancellation device such that the receiver of the noise cancellation device receives the prompted words from the user of the mobile phone and the processor of the noise cancellation device runs the software of the voice training device. Alternatively, the noise cancellation device may comprise software loaded on another computer or may comprise a stand alone device.

Using the enrollment or training period, acoustic modeling may be done to develop an audio footprint of the user. In sound synthesis, physical modeling synthesis refers to methods in which the waveform of the sound to be generated is computed by using a mathematical model, being a set of equations and algorithms to simulate a physical source of sound, usually a musical instrument. Such a model may include (possibly simplified) laws of physics that govern the sound production, and typically has several parameters, some of which are constants that describe the physical materials and dimensions of the instrument, while others are time-dependent functions. Many methods of acoustic modeling or physical modeling are known to those skilled in the art and any suitable method may be used.

Using the information relating to speech recognition and/or acoustic modeling, an audio footprint may be developed. An audio footprint can be used to identify the majority of frequencies likely to be produced by a user. For example, the majority of frequencies produced by a user can be predicted to be concentrated in a certain region of the audio spectrum. Differing people have different audio footprints. These differing audio footprints result in a variety of sounds. A specific audio footprint does not mean that the person does not speak in other frequencies; rather its overall sounds is concentrated in a specific area of the audio spectrum.

Outputting the audio footprint to the noise cancellation device, and subsequent use of the audio footprint by the processor of the noise cancellation device, can facilitate creation of an inverse waveform by the noise cancellation device in a frequency range that will attenuate or cancel the user noise wave.

Figure 4A:
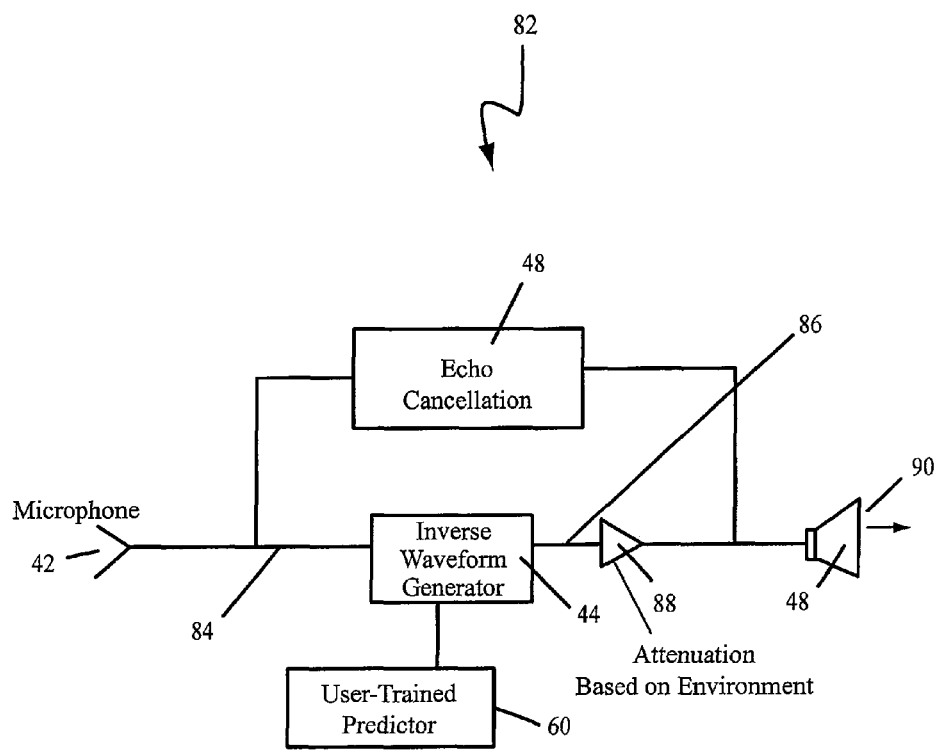
FIG. 4a depicts a circuit diagram of a noise cancellation device, in accordance with some examples.

FIG. 4*a* depicts a circuit diagram of a noise cancellation device. More specifically, FIG. 4*a* illustrates a circuit diagram 82 of a noise cancellation device in accordance with various examples disclosed herein. As shown, a microphone 42 picks up a sound wave. The sound wave 84 is directed to an inverse waveform generator of a processor 44. The processor 44 is associated with a voice training device 60 such that the processor 44 uses information from the voice training device 60 in generating a noise cancellation waveform. It is to be appreciated that the processor 44 need not be continuously coupled to the voice training device 60 but instead may use information previously input to it from the voice training device 60. The processor 44 outputs an inverse signal 86. The inverse signal 86 may be further processed for attenuation 88 based on environmental factors or surrounding noise. A noise cancellation sound wave 90 is then output by the speaker 48. As shown, the sound wave 84 picked up by the microphone 42 may be processed by an echo cancellation element 48 such that echo cancellation may be performed prior to output of the noise cancellation sound wave 90.

Figure 4B:
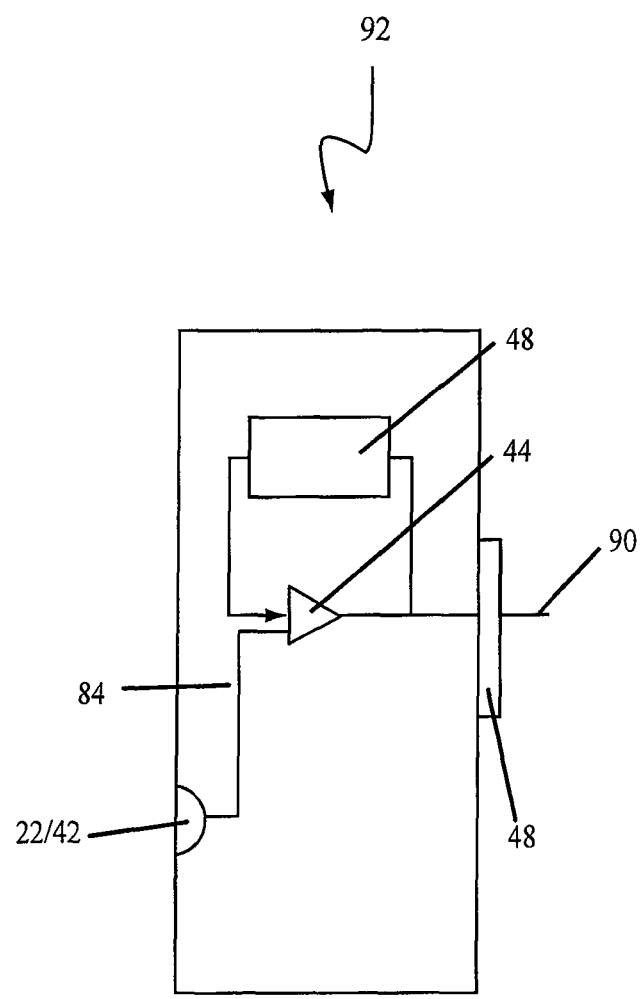
FIG. 4b depicts a circuit diagram of integrated phone and noise cancellation device, in accordance with some examples.

FIG. 4b depicts a circuit diagram of integrated phone and noise cancellation device. More specifically, FIG. 4b illustrates a circuit diagram 92 of a mobile phone of an integrated noise cancellation system in accordance with some examples. As shown, the shared microphone 22, 42 picks up an input sound wave 84 from the user. The input sound wave 84 is attenuated using a processor 44 of a noise cancellation device and a noise cancellation sound wave 90 is output by the speaker 48. The sound wave 84 further may be processed by a wave cancellation element 48 before output by the speaker 48.

Figure 5:
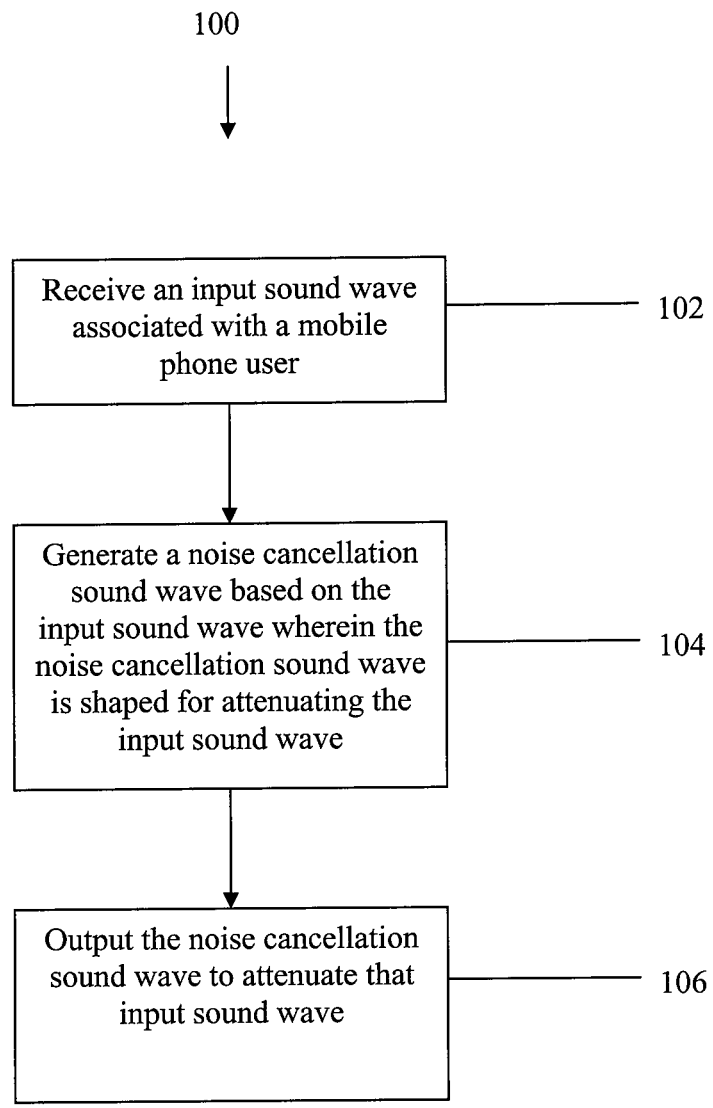
FIG. 5 is a flowchart of a method for phone noise cancellation, in accordance with some examples.

FIG. 5 is a flowchart of a method for phone noise cancellation. More specifically, a method 100 for noise cancellation or attenuation associated with a mobile phone, is shown in FIG. 5. As shown, an input sound wave associated with a mobile phone user is received [block 102], for example via a shared microphone of a mobile phone and a noise cancellation device. A noise cancellation sound wave is generated based on the input sound wave [block 104]. The noise cancellation sound wave may be shaped for attenuating the input sound wave. Such generation may be by an inverse waveform generator of a processor of a noise cancellation device. The noise cancellation sound wave is then output to attenuate the input sound wave [block 106]. The noise cancellation sound wave may be output from a speaker of the noise cancellation device where the speaker is located proximate the microphone of a mobile phone and, thus, the mouth of the mobile phone user.

Figure 6:
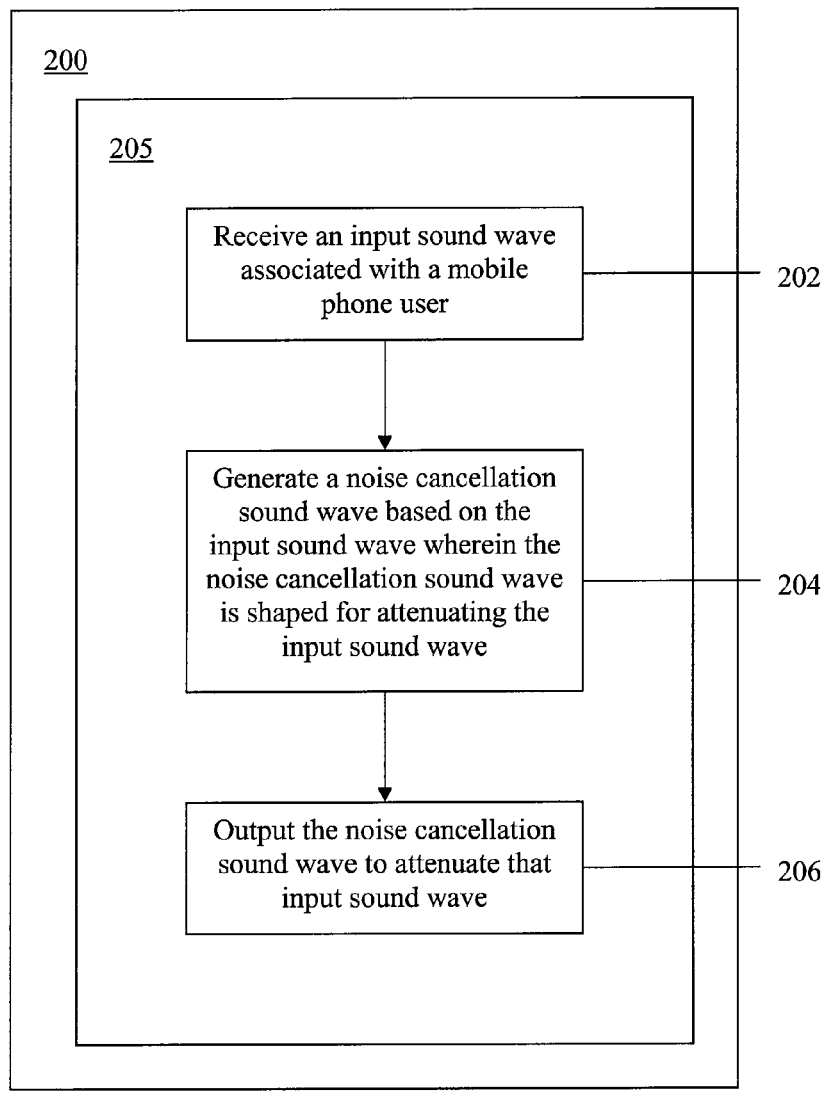
FIG. 6 is a block diagram of a system suitable for phone noise cancellation, in accordance with some examples.

FIG. 6 is a block diagram of a system suitable for phone noise cancellation. As shown in the schematic of FIG. 6, in one example, a computer system 200 may include a processor 205 configured for performing an example of a method for noise cancellation or attenuation. In other examples, various steps or portions of various steps of the method may be performed outside of the processor 205. In various examples, the method may include receiving an input sound wave associated with a mobile phone user [block 202]. A noise cancellation sound wave is generated based on the input sound wave [block 204]. The noise cancellation sound wave may be shaped for attenuating the input sound wave. The noise cancellation sound wave is then output to attenuate the input sound wave [block 206].

Figure 7:
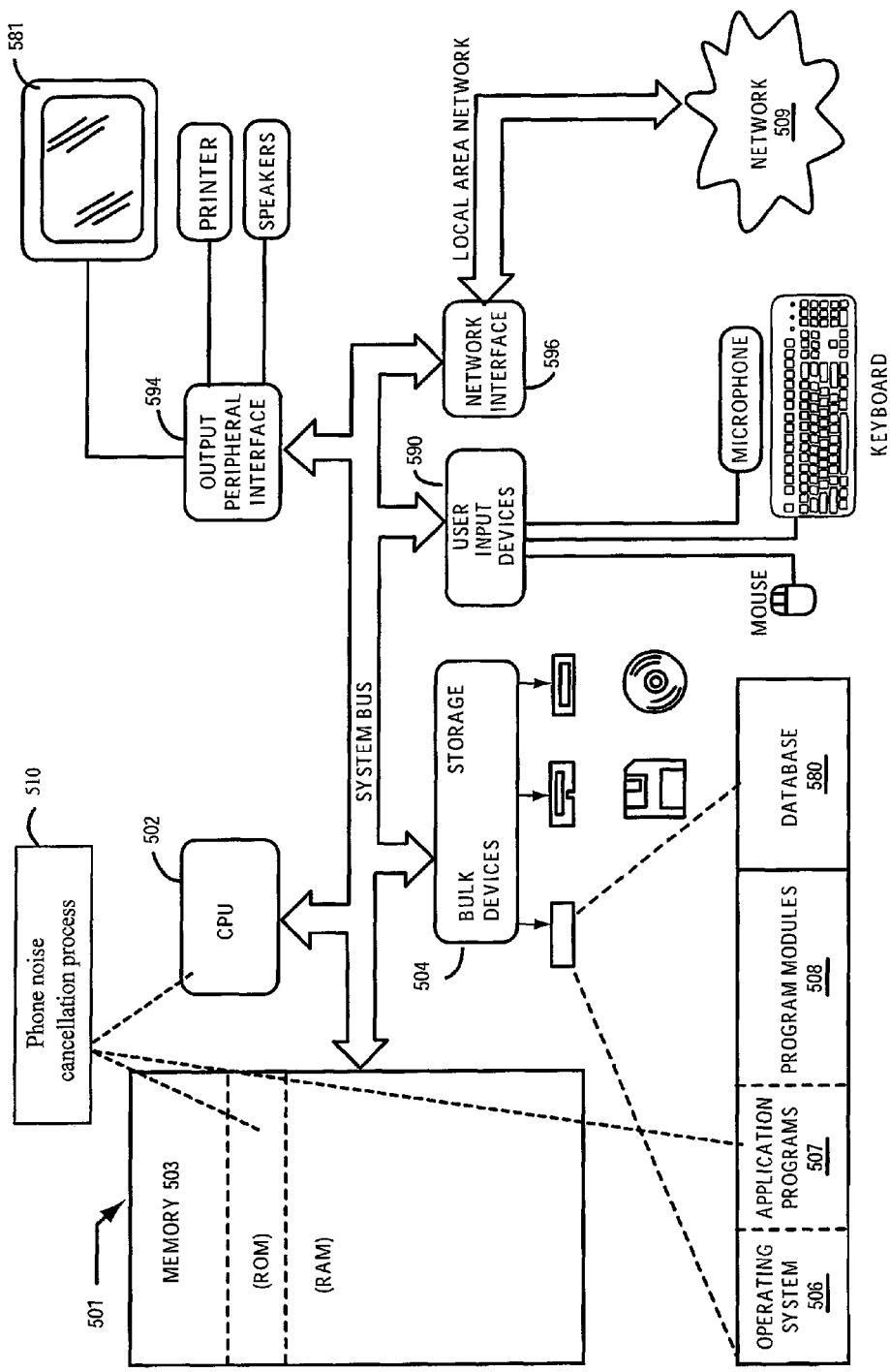
FIG. 7 is a schematic of a computing environment for a noise cancellation system, in accordance with some examples.

Any or all of the elements of the noise cancellation system may be provided in a computer environment. For examples, the phone, the noise cancellation device, or the voice training device may be provided on, as part of, or with a computer environment, such as shown in FIG. 7. In other examples, processors of various components may be provided with the computer environment. FIG. 7 is a schematic of a computing environment for a noise cancellation system. As shown in FIG. 7, the computing system includes a computer 501, including a central processing unit (CPU), also referred to as a processor, 502, main memory 503 and one or more bulk storage devices 504. A phone noise cancellation/reduction process may be associated with one or more of the processor 502, main memory 503, or other portion of the computer 501. The processor 502 can generally be of any desired configuration including but not limited to a microprocessor (μP), a microcontroller (μC), a digital signal processor (DSP), or any combination thereof. Thus, each processor 502 can include logic for executing program instructions as well as other functional blocks such as an arithmetic logic unit (ALU), a floating point unit (FPU), a digital signal processing (DSP) core, registers, accumulators, etc. The main memory 503, which may be any suitable form of memory including, but not limited to, volatile memory such as random access memory (RAM), non-volatile memory such as read only memory (ROM) and flash memory storage, data storage devices such as magnetic disk storage (e.g., hard disk drive or HDD), tape storage, optical storage (e.g., compact disk or CD, digital versatile disk or DVD), or other machine-readable storage mediums that can be removable, non-removable, volatile or non-volatile.

The bulk storage devices 504 and their associated computer storage media provide storage of computer readable instructions, data structures, program modules and other data for the computer 501. The bulk storage devices 504 can also include an operating system 506, application programs 507, program modules 508, and a database 580. The computer 501 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to the processor 502 through a user input interface that is coupled to a system bus, but may be connected by other interface and bus structures, such as a parallel port, game port or a universal serial bus (USB). Computers such as computer 501 may also include other peripheral output devices such as speakers, which may be connected through an output peripheral interface 594 or the like. The computer may include a display 581.

The computer 501 may operate in a networked environment using logical connections to one or more computers, such as a remote computer connected to network interface 596. The remote computer may be a personal computer, a server, a router, a network PC, a peer device or other common network node, and can include many or all of the elements described above relative to computer 501. The remote computer may be considered the other of the client or the server depending on the designation of the computer 501. Networking environments are commonplace in offices, enterprise-wide area networks (WAN), local area networks (LAN), intranets and the Internet. Source and destination machines need not be connected by a network 509 or any other means, but instead, data may be migrated via any media capable of being written by the source platform and read by the destination platform or platforms. When used in a LAN or WLAN networking environment, the computer 501 is connected to the LAN through a network interface 596 or an adapter. When used in a WAN networking environment, computer 501 typically includes a modem or other means for establishing communications over the WAN, such as the Internet or network 509. It will be appreciated that other means of establishing a communications link between the computers may be used.

Figure 8A:
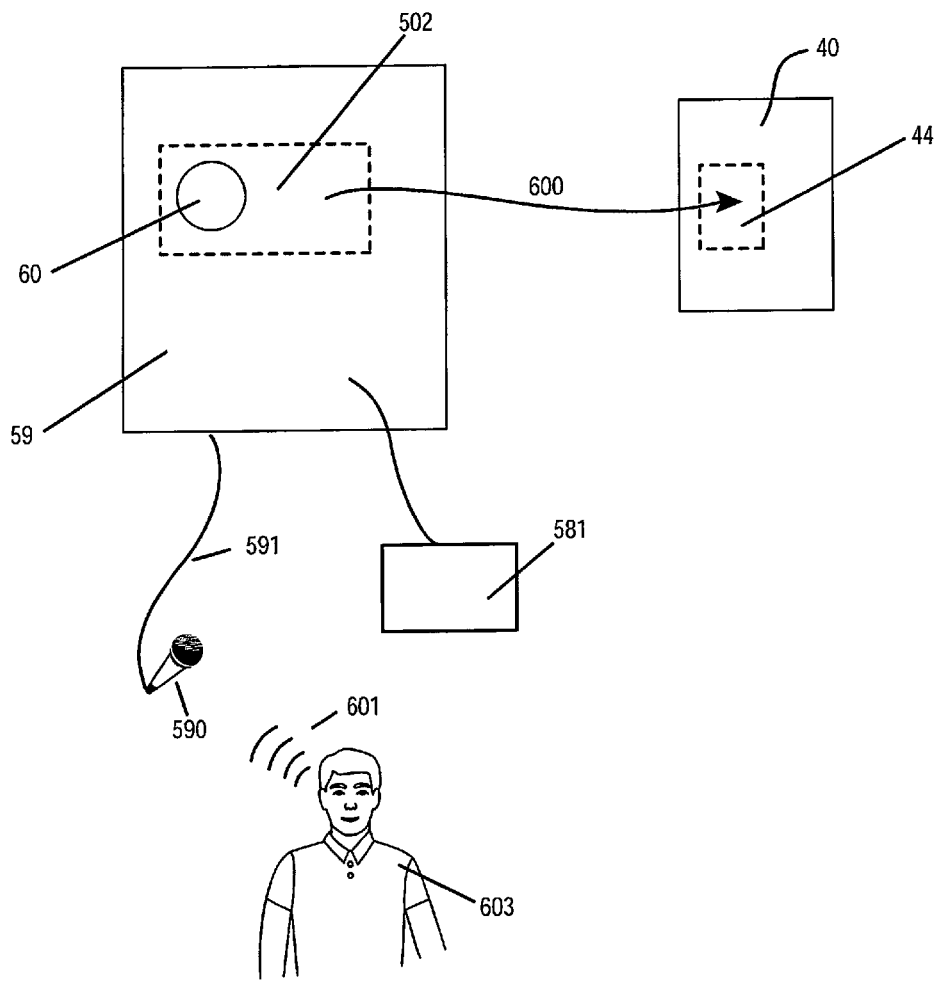
FIG. 8a is a flowchart of data flow for initializing a noise cancellation system, in accordance with some examples.

FIG. 8a is a flowchart of data flow for initializing a noise cancellation system in accordance with some examples, As shown, a voice recognition device 60 may be provided for developing an audio footprint 600 of a mobile phone user 603. It is to be appreciated that developing such audio footprint 600 may be done a single time with the noise cancellation device or may be done periodically. The voice recognition device 60 may, in some examples, be software loaded on a computer 501 such as shown in FIG. 7. Thus, developing an audio footprint may include prompting, for example via a display 581, the user 603 to speak an input device 590 such as a microphone. The microphone captures sound waves 601 from the user 603 and transmits the captured sound waves 601 to the processor 502 of the computer via connection 591. The connection 591 may be wired, as shown, or wireless. The processor 502 may then analyze the captured data and develop an audio footprint based on known voice recognition algorithms. The audio footprint 600 may be transmitted from the processor 502 for use with the noise cancellation system. Such transmission may be via file downloading onto a disk, via internet or other wireless connection, or other.

The audio footprint 600 may be loaded onto the processor 44 of the noise cancellation device 40 of the noise cancellation system 10. It is to be appreciated that, in various examples, the processor 44 may be a shared processor of the noise cancellation device 40 and a phone 20 of the noise cancellation system 10. Loading of the audio footprint 600 may be done via a memory stick input to the noise cancellation device 40 and communicating with the processor 44 via a data bus, may be via a wireless connection directly to the processor 44, or may be via any suitable connection.

Figure 8B:
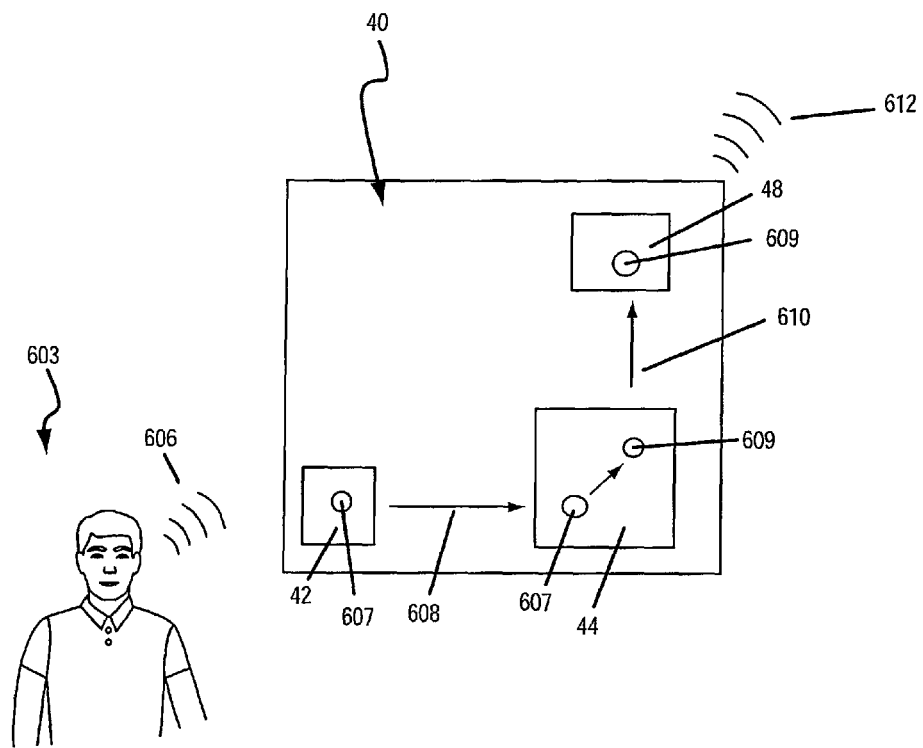
FIG. 8b is a flowchart of data flow through a noise cancellation system, in accordance with some examples.

FIG. 8b is a flowchart of data flow through a noise cancellation system. More specifically, FIG. 8b illustrates data flow of using a noise cancellation system. As shown, a user speaks and generates an input sound wave 606. The input sound wave is received by the receiver 42 of the noise cancellation device 40. The receiver 42 transmits data 607 relating to the input sound wave 606 to the processor 44 of the noise cancellation device 40. The data 607 may be transmitted over, for example, a data bus 608 or other suitable connection. The processor processes the data 607 to generate a noise cancellation sound wave. Data 609 relating to the noise cancellation sound wave is transmitted to the speaker 48. The data 609 may be transmitted over, for example, a data bus 610 or other suitable connection. The speaker converts the data 609 into the noise cancellation sound wave 612 and outputs the noise cancellation sound wave 612.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting. The foregoing describes various examples of attenuation or cancellation of noise associated with phones. Following are specific examples of methods and systems of attenuation or cancellation of noise associated with phones. These are for illustration only and are not intended to be limiting.

The present disclosure generally relates to systems and methods for attenuation or cancellation of noise associated with phones, such as mobile phones. In some examples, the systems may include a phone having a microphone and a noise cancellation device. In some examples, the noise cancellation device has a microphone for receiving an input sound wave and positioned proximate the phone microphone, a processor for generating a noise cancellation sound wave based on the input sound wave, and a speaker for outputting the noise cancellation sound wave. The phone microphone and the noise cancellation device microphone can be shared or different microphones, and can also be microphone is integral to the phone. The shared or separate microphones can be part of a phone headset.

In other examples, a noise cancellation device processor is shared with the phone for operating the phone. The phone and the noise cancellation device can be substantially integral. In some examples, the noise cancellation device is configured to be retrofit to the phone.

In yet other examples, the noise cancellation device also can include an echo cancellation element configured to minimize reception by the microphone of the noise cancellation sound wave. Additionally, the noise cancellation device can be configured for receiving information relating to environmental characteristics and for using this information in generating a noise cancellation sound wave.

The present disclosure also relates to a voice training device wherein the voice training device is provided in some examples to develop an audio footprint of a phone user and wherein the audio footprint is used by the noise cancellation device processor for generating a noise cancellation sound wave. The voice training device can use a hidden Markov model to develop the audio footprint and can be configured to operate an enrollment stage during which the user of a mobile phone is prompted to say specific words having a range of sounds.

The present disclosure further relates to noise cancellation systems for use with a phone, which have a noise cancellation device configured for coupling with the phone and including a microphone for receiving an input sound wave from a user speaking into a phone a processor for generating a noise cancellation sound wave based on the input sound wave, a speaker for outputting the noise cancellation sound wave, and an echo cancellation element configured to minimize reception by the microphone of the noise cancellation sound wave. A voice training device can be provided, which is configured to develop an audio footprint of a phone user wherein the audio footprint is used by the noise cancellation device processor for generating a noise cancellation sound wave. The voice training device can be configured to operate an enrollment stage during which a user of the mobile phone is prompted to say specific words having a range of sounds.

The disclosure also generally relates to a method for canceling noise associated with a phone conversation. In some examples of the method, an audio footprint of a mobile phone user is developed, an input sound wave is received, a noise cancellation sound wave based on the input sound wave is generated, and the noise cancellation sound wave is outputted. Environmental information can be received, so that the generating a noise cancellation sound wave can be based in part on the environmental information. Echo can be cancelled to minimize reception by the microphone of the noise cancellation sound wave. In addition, an audio footprint is developed in some examples, and a hidden Markov model can be used for this purpose. The developing of the audio footprint can include prompting the mobile phone user to say specific words having a range of sounds.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically matable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for phone noise attenuation comprising:
   a phone configured to receive an input sound wave, the phone comprising:
   a display configured to display information related to usage of the phone including a phone number from which a call is received, a phone number being called, and a menu;
   a keyboard; and
   an auxilliary port; and
   a noise cancellation device comprising:
   a noise cancellation microphone configured to receive the input sound wave;
   a processor configured to determine an amplitude and a polarity of the input sound wave and generate a noise cancellation sound wave having an amplitude and polarity selected to reduce an amplitude of the input sound wave, wherein the processor is further configured to attenuate the noise cancellation sound wave based on local environmental characteristics including surrounding air temperature;
   a read-only memory configured to store information related to use of the noise cancellation device;
   a power supply configured to provide power to the noise cancellation device, the power supply further configured to be recharged via a universal serial bus port, the power supply comprising a battery including a nickel metal-hydride battery, a lithium-ion battery, or a lithium-polymer battery;
   a speaker configured to output the noise cancellation sound wave; and
   an echo cancellation device configured to recognize the noise cancellation sound wave and, when it reappears though an input of the phone, suppress or cancel the noise cancellation sound wave; and
   a voice training device coupled to the processor and including software stored in the memory including a statistical model for training to identify a speech pattern of the user, the statistical model including a hidden Markov model configured to output a sequence of symbols, wherein the voice training device is configured to train the processor to identify the speech pattern of the user using the statistical model, including to identify frequencies and amplitudes of the speech pattern of the user, and wherein the voice training device is configured to train the noise cancellation device during an enrollment period with a voice of the user, and wherein the voice training device is configured to identify a majority of frequencies likely to be produced by the user, and wherein identifying the speech pattern of the user facilitates attenuation of the input sound wave,
   wherein the noise cancellation device is operatively associated with the phone such that the input sound wave input to the phone is attenuated by the noise cancellation device.

2. The system of claim 1, wherein the phone and the noise cancellation device are substantially integral.

3. The system of claim 1, wherein the voice training device and the phone are substantially integral.

* * * * *